Figure 1:
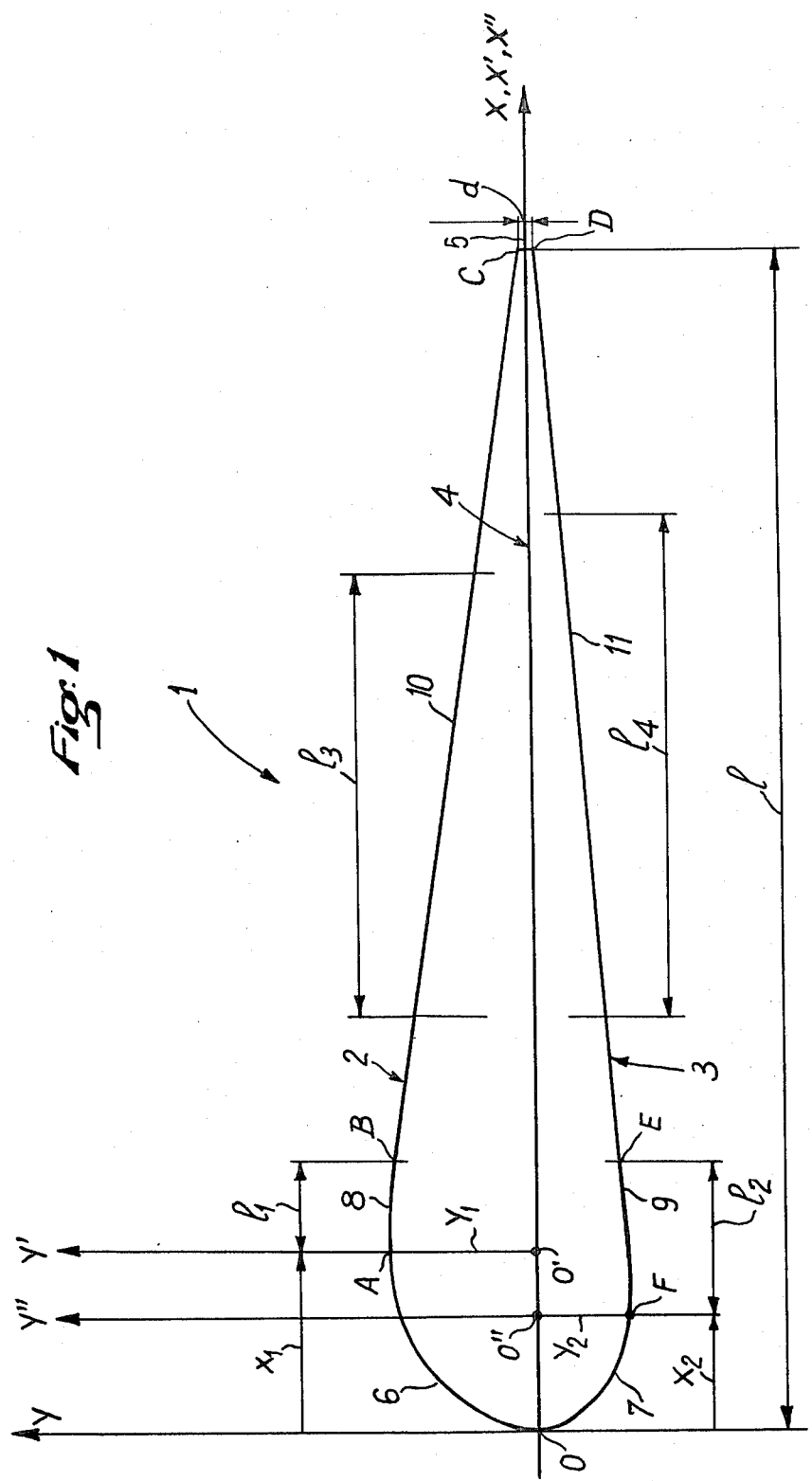

United States Patent [19]

Vinas Espin et al.

[11] 4,240,598
[45] Dec. 23, 1980

[54] HIGH PERFORMANCE AERODYNAMIC AIRFOIL FOR AIRCRAFT WING

[75] Inventors: Geneviève M. G. Vinas Espin, Viroflay; Yves F. P. Marchoisne, Paris; Michel Lazareff, Chatenay-Malabry, all of France

[73] Assignee: Societe Nationale Industrielle Aerospatiale, Paris, France

[21] Appl. No.: 6,292

[22] Filed: Jan. 25, 1979

[30] Foreign Application Priority Data

Feb. 2, 1978 [FR] France ............................... 78 02883
Oct. 13, 1978 [FR] France ............................... 78 29225

[51] Int. Cl.³ .......................... B64C 3/14; B64C 27/46
[52] U.S. Cl. ............................... 244/35 R; 416/223 R
[58] Field of Search ........................ 244/35 R, 45 R; 416/223 R, DIG. 2; 114/274

[56] References Cited

U.S. PATENT DOCUMENTS 2,257,260  9/1941  Kartveli .......................... 244/35 R

FOREIGN PATENT DOCUMENTS 2401684  7/1975  Fed. Rep. of Germany ........ 244/35 R Primary Examiner—Charles E. Frankfort
Attorney, Agent, or Firm—Merriam, Marshall & Bicknell

[57] ABSTRACT

The invention relates to a high performance aerodynamic airfoil for aircraft wing, wherein the airfoil is biconvex and is such that the corresponding wing comprises an advanced maximum total thickness and at least substantially zero curvature over the major part of the airfoil surfaces of the upper surface and lower surface, downstream of the maximum total thickness, the point of maximum thickness of the lower surface being nearer the leading edge than the point of maximum thickness of the upper surface. The invention finds particular application to the manufacture of fixed or rotary wings of aircraft.

11 Claims, 5 Drawing Figures

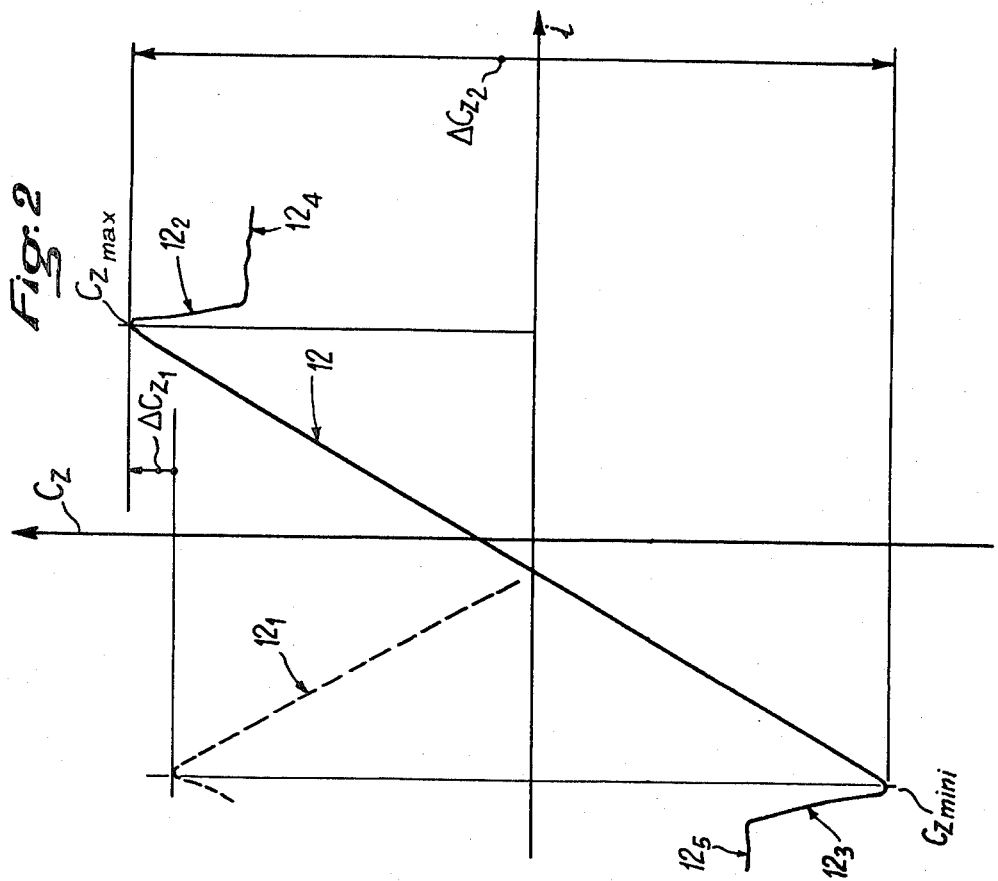
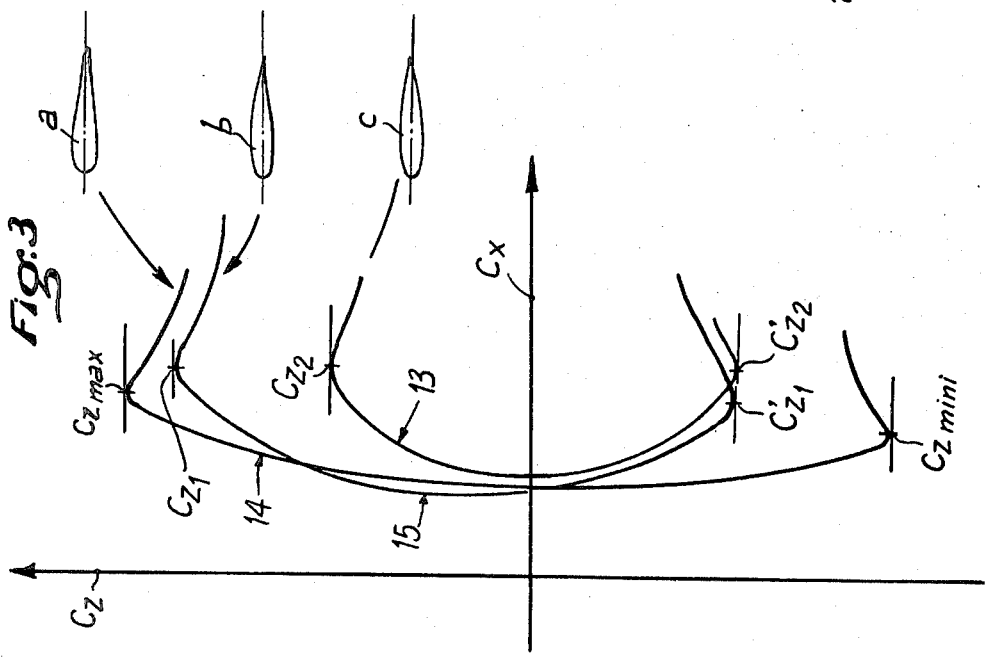

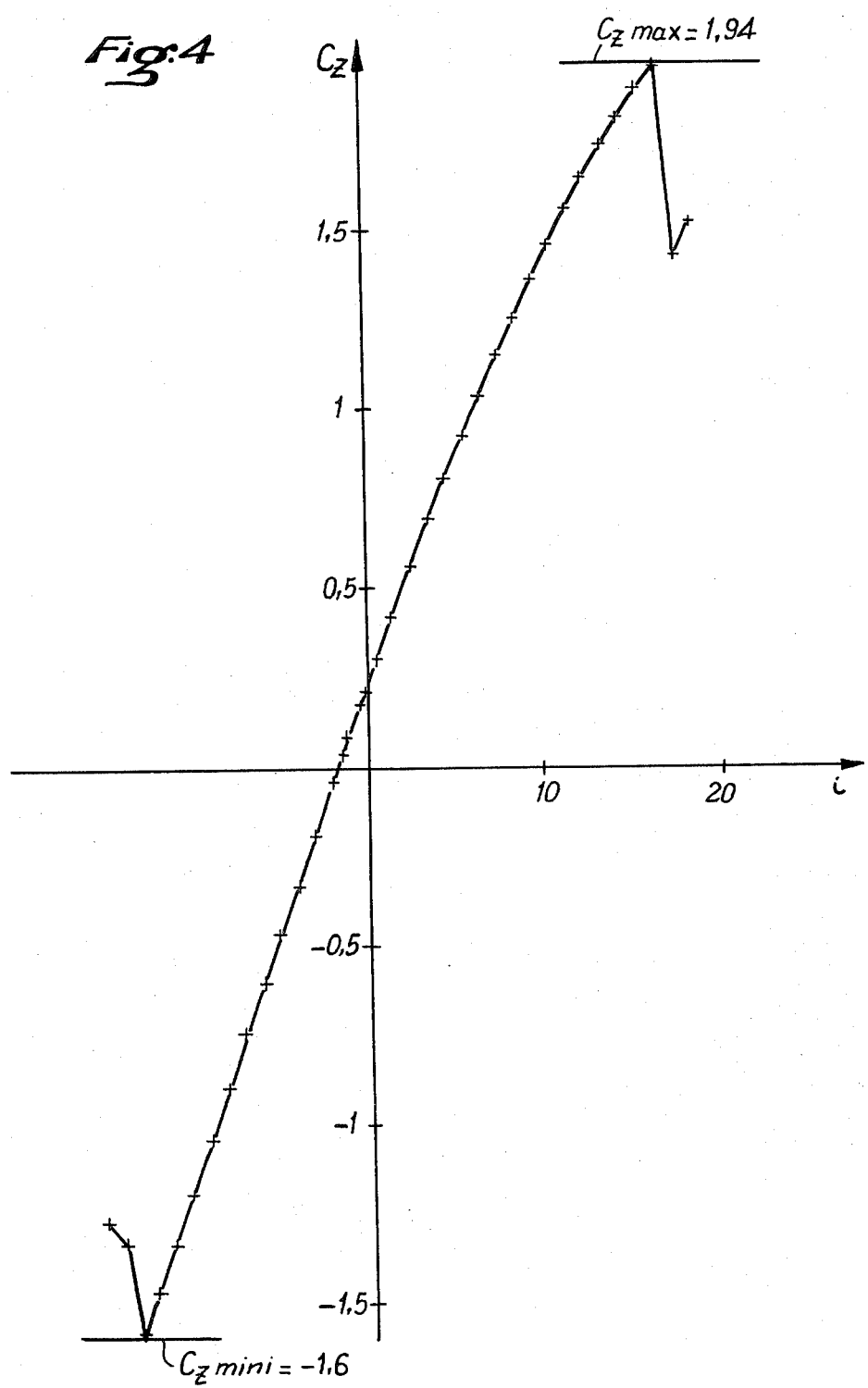

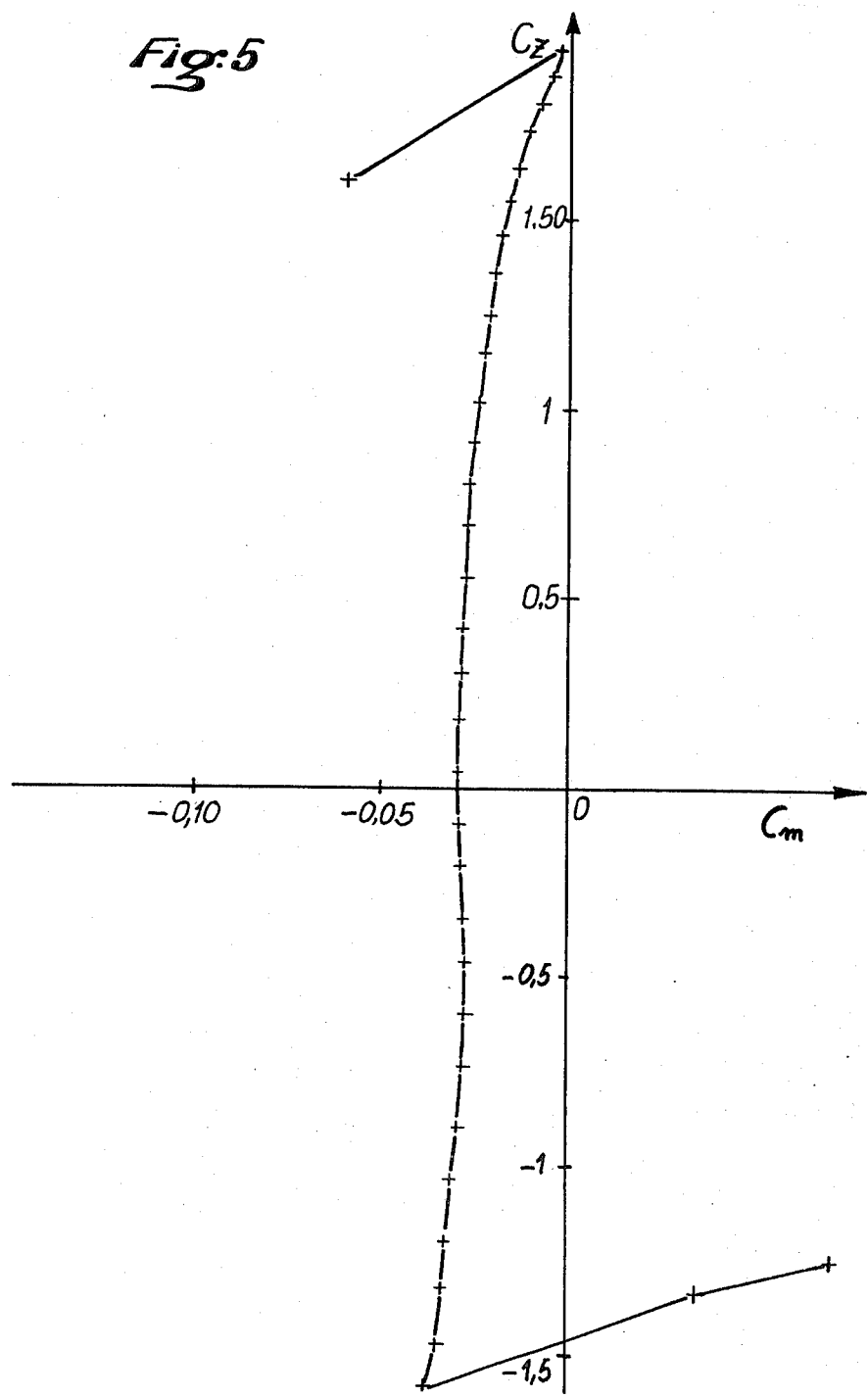
Fig:5

HIGH PERFORMANCE AERODYNAMIC AIRFOIL FOR AIRCRAFT WING

The present invention relates to the airfoil surfaces used in aeronautics and, more particularly, it relates to a high performance aerodynamic airfoil which may be used in particular for making the fixed wing of a light aircraft, for example for aerobatics.

It is known that the definition of a wing necessitates the choice and adaptation of a airfoil, which results, after its development, from a compromise between several aerodynamic parameters.

For example, for a light aircraft for travel or training, intended temporarily to make specific aerobatic movements, such as looping, roll, sudden recovery, it is indispensable that the wing is designed to furnish the aerodynamic forces necessary for the best possible execution of these figures, both in normal flight and in inverted flight (upside down flight).

In addition, it is always advantageous if the resistance to advance in the air is low, and more particularly if its increase with the angle of attack remains within acceptable limits.

To attain these aims, particularly when the wing is constructed especially for a light aircraft having essentially to make aerobatics, it is therefore necessary to have both a high lift in normal flight and in inverted flight, these lifts having to be close to one another in order not to limit the possibilities of flight upside down. Moreover, the resistance to advance, or drag, must remain as low as possible, especially at large angles of attack, so that the apparatus loses as little speed as possible when carrying out tight manoeuvres.

It is known that the aerodynamic effort of lift of a wing depends on the relative position and on the design of its upper airfoil surface with respect to its lower airfoil surface and particularly on the development in the flow of the curvature adopted for said upper surface.

In fact, in the subsonic domain and as a general rule, a judicious increase in the curvature of the upper surface of the wing brings about an increase in the resultant lift of the profile.

However, this increase in lift is accompanied by an increase in drag which may cause the advantage of a gain in lift to be lost. It then becomes necessary to make, for the flight conditions envisaged, a compromise between the maximum coefficient of lift and the minimum coefficient of drag, i.e., in fact, allow a certain distribution and development of the forms composing the contour of the profile.

Aerodynamic airfoils with considerable camber are known which are perfectly adapted to the cruising flight of a light aircraft, enabling a high maximum coefficient of lift to be obtained for a low minimum coefficient of drag.

However, these airfoils, of which the upper surface and the lower surface are symmetrical with respect to a curved mean line, convex towards the upper surface, present a considerable difference between the maximum coefficient of lift and the minimum coefficient of lift, this not favouring the flight of the aircraft in inverse configuration.

To remedy this drawback, an airfoil is sometimes used, of which the upper surface and the lower surface are disposed symmetrically on each side of a rectilinear mean line. Such a symmetrical biconvex airfoil has a maximum coefficient of lift, which is substantially identical in normal flight and in inverted flight, but which remains generally lower than the maximum coefficient of lift given by the preceding dissymetrical biconvex profile. Within a certain range of thicknesses, the value of the relative thickness of the symmetrical biconvex airfoil may certainly be increased and a larger coefficient of lift may thus be obtained, but this is always to the detriment of the drag.

Furthermore, certain modern airfoils with a large radius of leading edge and with moderate curvatures on the upper surface and on the lower surface make a good ratio between the maximum lift and the minimum drag. These airfoils also have, at small angles of attack, a range of functioning where the coefficients of lift maintain substantially the same coefficient of drag, this promoting, for a given motorisation, the increase in the climbing speed. However, these airfoils present a very considerable variation between the maximum and minimum coefficients of lift, and they do not allow a sudden stall, as is often sought in aerobatics.

It is an object of the airfoil according to the invention to remedy these drawbacks by presenting both the advantages of an airfoil with considerable camber and of a symmetrical biconvex airfoil.

The invention also enables a usable range of lift between the maximum lift and the minimum lift, largely greater than all the known airfoils to be obtained.

The maximum and minimum coefficients of lift are high with a moderate advantage on the positive side. The polar curve of the coefficient of lift as a function of the coefficient of drag, is of the parabolic type almost up to stall, which is sharp and similar for the positive and negative angles of attack, but with a limited amplitude in the two cases.

The quasi-absence of hysteresis between the increasing and decreasing angles of attack of the airfoil allows a resustaining without delay of the flow, thus a greater safety during manoeuvres. The slow increase of the coefficient of drag with the angle of attack and the high values of the coefficient of lift make it possible to obtain, at high gradient, an aerodynamic efficiency ensuring excellent performances on climbing and a limited deterioration thereof in turbulence.

Moreover, the linearity of the curve of the moments between the stalls at the positive and negative angles of attack allows a centering with minimum static margin and the manoeuvrability associated therewith.

Furthermore, the moment coefficient at zero lift is very low.

All these results, obtained due to the understanding of the nature and the mechanism of the phenomenon of boundary layer, have made it possible to define, after a complete experimentation, a particular airfoil, of which the geometric characteristics may develop within determined limits.

Thus, by its aerodynamic qualities, the airfoil makes it possible to design, apart from wings specific of aerobatic aircraft, wings for light aircraft for travel or training, as well as rotary wings for helicopters. A wing having the airfoil according to the invention essentially comprises a very advanced chordwise point of maximum thickness and a zero or substantially zero curvature of the major part of the airfoil surfaces located downstream of said chordwise point of maximum thickness.

To obtain the results mentioned hereinabove, the aerodynamic wing airfoil according to the invention comprising non-concave upper and lower surfaces, which are disposed dissymmetrically on either side of a datum axis formed by the chord of the airfoil, which are forwardly limited, along said chord, by a leading edge and rearwardly by a trailing edge, and of which the respective thicknesses are counted from said chord, is characterised in that the lower surface and the upper surface respectively comprise on the one hand a first convex region of variable curvature disposed between the leading edge and their points corresponding to the maximum lower surface and upper surface thicknesses and intended to produce, partially or totally, the acceleration and depression of the fluid, and, on the other hand, a second region disposed between said points corresponding to the maximum lower surface and upper surface thicknesses and the trailing edge and subdivided into a first convex zone with moderately variable curvature disposed immediately behind said points corresponding to the maximum lower surface and upper surface thicknesses and ensuring the deceleration and rapid recompression of the fluid, and into a second zone following the first and continuing to the trailing edge, this second zone presenting a zero or substantially zero curvature and extending over at least 50% and at the most 96% of the length of the chord, said second zone continuing more weakly the deceleration and ensuring the recompression of the fluid with a pressure gradient which diminishes in the direction of flow, in that said maximum thicknesses are disposed from the leading edge at a distance at the most equal to 22% of the length of said chord, and in that the ratio between the maximum thickness of the lower surface and the maximum thickness of the upper surface is at least equal to 0.25 and at the most equal to 1. The orthogonal projection on the chord of the point of maximum thickness of the lower surface is preferably nearer the leading edge than the corresponding orthogonal projection of the point of maximum thickness of the upper surface.

Due to the airfoil according to the invention, airfoil surfaces may thus be obtained presenting a variation between the maximum and minimum values of the coefficient of lift at least equal in algebraic value to 3. To this end, it is particularly important that no part of the lower surface becomes concave: the lower surface must always be convex or flat, in its second region, but never concave.

The maximum thickness of the upper surface is preferably placed from the leading edge at a distance at least equal to 12% and at the most equal to 20% of the length of the chord, whilst the maximum thickness of the lower surface is placed from the leading edge at a distance at least equal to 3.75% and at the most equal to 18% of the length of the chord.

The first convex region with variable curvature of the lower surface and of the upper surface, as well as the first zone with moderately variable curvature of each of the second regions of the lower surface and of the upper surface located downstream of the respective maximum thicknesses of the lower surface and of the upper surface, are defined approximately by analytical equations of the pseudo-elliptic type and for a value of the total maximum thickness of between 8 and 22% of the length of the chord.

Moreover, said first zone of moderate curvature of the upper surface extends along the chord of the airfoil over a length at least equal to 40% and at the most equal to 150% of the length of the region with variable curvature which precedes it. On the other hand, the first zone with moderate curvature of the lower surface extends along the chord of the section over a length at least equal to 6% and at the most equal to 140% of the length of the region of variable curvature which precedes it.

The trailing edge of the airfoil advantageously comprises a base which is preferably disposed symmetrically on each side of the chord and of which the thickness represents at least 0.2% and at the most 1% of the length of said chord.

The invention will be more readily understood on reading the following description with reference to the accompanying drawings, in which:

FIG. 1 schematically shows the basic shape of an airfoil according to the invention and its elements of geometrical definition.

FIGS. 2 and 3 illustrate the aerodynamic advantages of the airfoil according to the invention.

FIGS. 4 and 5 relate to experimental results.

Referring now to the drawings, the wing airfoil according to the invention, shown schematically in FIG. 1, bears the general reference 1 and may be geometrically defined from a system of orthogonal axes OX and OY, which also serve as reference for secondary systems of orthogonal axes $O'X', O'Y'$ and $O''X'', O''Y''$.

The airfoil 1 comprises an upper surface 2 and a lower surface 3, both convex, which are disposed dissymmetrically on either side of the datum axis OX superposed to the geometric chord 4, of length l, of the airfoil and which are limited along said chord forwardly by a leading edge located at point 0 and rearwardly by a trailing edge 5.

The upper surface 2 and the lower surface 3 comprise on the one hand a first convex region with variable curvature bearing respectively reference 6 or reference 7 and disposed between the leading edge 0 and the corresponding maximum thicknesses $Y_1$ or $Y_2$ of the upper surface and of the lower surface and on the other hand a second region 8, 10 or 9, 11 respectively, located between the maximum thicknesses $Y_1$ and $Y_2$ and the trailing edge 5.

The maximum thicknesses $Y_1$ and $Y_2$ of upper surface and lower surface respectively thus separate the front regions from the rear regions of the airfoil and are positioned on the chord 4 by the abscissae $X_1$ and $X_2$. The pairs of coordinates $X_1$, $Y_1$ and $X_2$, $Y_2$ respectively define the extreme point A of the upper surface 2 and the extreme point F of the lower surface 3.

The sum $Y_0$, in absolute value, of the maximum ordinate $Y_1$ and of the minimum ordinate $Y_2$, represents the value of the total maximum thickness.

The abscissae $X_1$ and $X_2$ correspond respectively at most to 20% and to 18% of the length l of the chord 4. This position, very close to the leading edge 0, of the maximum thicknesses $Y_1$ and $Y_2$ of the upper surface and of the lower surface is, however, such that the abscissa $X_1$ is at least equal to 12% and at the most equal to 20% of the length l of said chord 4, whilst the abscissa $X_2$ is at least equal to 3.75% and at the most to 18% of the length of the chord. Consequently, the difference between the abscissae $X_1$ and $X_2$ does not exceed 16.25% of the length l of the chord, the abscissa $X_1$ and the abscissa $X_2$ preferably being such that $X_1 > X_2$, although one may have $X_1 = X_2$ or even $X_1 < X_2$. The first regions 6 and 7 with variable curvature essentially ensure, both at positive angles of attack and at negative angles of attack of the airfoil in the flow of fluid, the acceleration and depression of the fluid flowing on the surface of these regions. After this acceleration and the creation of a depression allowing the production of a lift force, the fluid undergoes a deceleration and a rapid recompression in the zones immediately located downstream of the maximum total thickness. These first zones, bearing respectively reference 8 for the upper surface 2 and reference 9 for the lower surface 3, extend respectively along the chord of the airfoil, over a length $l_1$ or $l_2$, at least equal to 40% and at the most equal to 150% of the length $X_1$ of the region 6 with variable curvature for zone 8, and at least equal to 6% and at the most equal to 140% of the length $X_2$ of the region 7 of variable curvature for zone 9.

To pursue more weakly, downstream of these first zones 8 and 9, the deceleration and recompression of the fluid with a pressure gradient which diminishes in the direction of flow, the airfoil continues by second zones 10 or 11 respectively, of which the curvature is zero or substantially zero.

These second zones extend to the trailing edge 5 and comprise intermediate zones of lengths $l_3$ or $l_4$ respectively, of which the curvature is strictly zero, said lengths $l_3$ or $l_4$ being at least equal to 50% and at the most equal to 96% of the length l of the chord 4.

Thus, the combined effects of the first and second regions make it possible to obtain a good stabilisation of the flow near the surface of the airfoil, up to the angles of attack, where the loss of lift is produced.

This is essentially translated, for the airfoil surfaces of a wing presenting the profile according to the invention, by high maximum and minimum coefficients or lift which may be close to each other.

These results are partly due to the position of the upper surface with respect to the lower surface and particularly to the ratio, in absolute value, between the minimum ordinate $Y_2$ and the maximum ordinate $Y_1$ of the maximum total thickness, which is at least equal to 0.25 and at the most equal to 1, as well as to the fact that at no spot is the lower surface concave.

FIG. 2 shows, for a wing presenting one of the airfoils according to the invention, the development of the coefficient of lift $C_Z$ as a function of the angle of attack i of the wing in a fluid flow. This figure shows the relative variation $\Delta C_z$ which exists between the maximum coefficient $C_{Z\ max}$ and the absolute value of the minimum coefficient $C_{Zmini}$. This variation $\Delta C_{Z1}$, indicated with respect to the dotted curve $12_1$, which represents, with a view to simplifying the drawing, the symmetrical image with respect to the X-axis of the part of the negative angles of attack of the curve 12, may be very small. Moreover, the variation $\Delta C_{Z2}$ between $C_{Z\ max}$ and $C_{Z\ mini}$, defined algebraically by the equation $\Delta C_{Z2} = C_{Z\ max} - C_{Z\ min}$, may reach a value close to 3.5.

FIG. 2 shows the existence, after the point where the coefficient of lift is maximum or minimum, of a sharp drop of lift as illustrated by the portions of curve $12_2$ and $12_3$. However, this sharp stall has a limited amplitude as shown by the curve element $12_4$ and $12_5$, and as there is a quasi-absence of hysteresis between the increasing and decreasing angles of attack of the airfoil, it is possible for the pilot of an aircraft equipped with a wing having an airfoil according to the invention, to provoke a resustaining without delay of the flow around the airfoil. This feature is very important, as it ensures safety during manoeuvres, whether the aircraft is temporarily acting like an aerobatic aircraft or whether it is making a flight with large angle of attack. In this latter case, the slow development of the coefficient of drag with the angle of attack and the high values of the coefficient of lift allow excellent performances in steep climb, as the aerodynamic efficiency obtained, i.e. the ratio of the coefficient of lift to the coefficient of drag for the same angle of attack, is very high.

FIG. 3 allows, for an airfoil a according to the invention and for two known airfoils b and c having a maximum total thickness the same value, a comparison of the polar curves showing certain of the advantages of an airfoil according to the invention, said polar curves translating the development of the coefficient of lift $C_Z$ as a function of the coefficient of drag $C_X$.

For example, the curve 13, which relates to a symmetrical biconvex airfoil c shows a symmetrical development of the coefficients of lift for the same coefficient of drag, but also indicated that the maximum coefficient of lift $C_{Z2}$ is clearly lower than the maximum coefficient of lift $C_{Z\ max}$ of the curve 14, which concerns a airfoil a according to the invention. The curve 15 given for a non-symmetrical airfoil b, for example of the type such as those of the series designated NACA 23000, shows that the maximum coefficient of lift $C_{Z1}$ is greater than the maximum coefficient $C_{Z2}$ of the symmetrical biconvex airfoil, but remains lower than the highest coefficient of lift of the airfoil a.

Moreover, there exists a variation between the maximum and minimum lift of airfoil b, which may be very considerable, the ratio of the highest value to the smallest value being able to reach 1.8.

The polar curve of the airfoil a has at each point, located on either side of its intersection with the axis of the coefficients of drag $C_X$, a ratio $C_Z/C_X$ of which the value is very high, this enabling certain performances to be improved. These noteworthy results, obtained and confirmed by numerous tests in the wind tunnel, have shown the importance of the value of certain geometrical ratios, as well as the role of the maximum total thickness which occupies a very advanced position, but also have enabled the shape of an airfoil to be defined of which the value $Y_0$ of the maximum thickness may develop between 8 and 22% of the length l of the chord.

The first regions 6 and 7 of variable curvature, as well as the first zones 8 and 9 of moderately variable curvature, may in fact be defined approximately by analytical equations giving, from the bases 0' and 0" of the maximum thicknesses of upper surface and lower surface on the chord 4, the ordinates Y of the airfoil as a function of the abscissa X in question, in systems of orthogonal axes O'X', O'Y' and O"X", O"Y", such that O'X' and O"X" are superposed on OX, and O'Y' and O"Y" parallel to OY.

The simplified equations are of the pseudo-elliptic type and reproduce the shapes, leading to the desired results, with an approximation comparable with the usual manufacturing tolerances.

Thus, for a chord of length l, a maximum cross section delimited on the one hand along the chord by the abscissae $X_1$ and $X_2$, and on the other hand by the maximum and minimum ordinates $Y_1$ and $Y_2$ the shape of the first region 6 of variable curvature of the upper surface 2, represented by the arc OA (FIG. 1) is advantageously determined in the system O'X',O',Y' by the following equation:

$$\left[\frac{|X|}{X_1}\right]^m + \left[\frac{Y}{Y_1}\right]^m = 1 \tag{1}$$

$|X|$ representing the absolute value of the variable X, with:

(2) $1.8 \leq m \leq 2.1$ and:

(3) $0.12 \times l \leq X_1 \leq 0.2 \times l$

Similarly, the shape of the first region 7 with variable curvature of the lower surface, represented by the arc OF, is advantageously determined in the system $O''X''$, $O''Y''$ by the following equation:

$$\left[\frac{|X|}{X_2}\right]^n + \left[\frac{Y}{Y_2}\right]^n = 1 \quad (4)$$

$|X|$ representing the absolute value of the variable X, with:

(5) $1.8 < n < 2$ and:

(6) $0.0375 \times l \leq X_2 \leq 0.18 \times l$.

In equations (1) and (4), the values of the parameters $Y_1$ and $Y_2$ are calculated from the following equations:

(7) $Y_1 + |Y_2| = Y_0$ (value of the maximum total thickness) $|Y_2|$ representing the absolute value of the maximum ordinate $Y_2$ with:

(8) $0.25 \leq |Y_2|/Y_1 \leq 1$ and:

(9) $0.08 \times l \leq Y_0 \leq 0.22 \times l$

The first zone 8 of moderately variable curvature of the upper surface 2 (FIG. 1), which follows the first region 6 over a length of chord $l_1$ at least equal to 40% and at the most equal to 150% of the length of chord $X_1$ delimiting said first region of upper surface, and which is represented by the arc AB is advantageously defined in the system $O'X', O'Y'$ by the following $$\left[\frac{X}{3X_1}\right]^p + \left[\frac{Y}{Y_1}\right]^p = 1 \quad (10)$$

with:

(11) $1.4 < p < 1.5$

The parameters $X_1$ and $Y_1$ being determined by equation (3), (7), (8) and (9). Similarly, the first zone 9 of moderately variable curvature of the lower surface 3, which follows the first region 7 over a length of chord $l_2$ at least equal to 6% and at the most equal to 140% of the length of chord $X_2$ delimiting said first region of lower surface, and which is represented by the arc FE, is advantageously defined in the system $O''X'', O''Y''$ by the following equation:

$$\left[\frac{X}{1.5 X_2}\right]^n + \left[\frac{Y}{Y_2}\right]^n = 1 \quad (12)$$

The parameters n, $X_2$ and $Y_2$ being determined by the equations (5), (6), (7), (8) and (9).

The second zones of the second regions of the airfoil, designed respectively by the references 10 for the upper surface 2 and 11 for the lower surface 3 (FIG. 1), which are respectively connected to points B and E of each of the first zones which precede them, extend to points C and D of the trailing edge.

The zone 10, limited by points B and C, and zone 11 limited by points E and D, have at least in their intermediate part a zero curvature over a length $l_3$ or $l_4$, at least equal to 50% and at the most equal to 96% of the length l of the chord.

However, said zones 10 and 11 may present a very slight convex curvature without the results envisaged by the invention being fundamentally changed. The trailing edge 5 of the airfoil comprises a base limited by points C and D, and is preferably disposed symmetrical on each side of the chord 4.

The thickness d of the base represents at least 0.2% and at the most 1% of the length of the chord l of the airfoil.

FIGS. 4 and 5 show the experimental results obtained for a wing with an airfoil according to the invention and for an identical air flow speed.

FIG. 4 shows the development of the coefficient of lift $C_Z$ at the positive angles of attack and negative angles of attack i of the airfoil and demonstrates, for a test speed of 55 m/s, the wide range of lift of the airfoil. As shown in FIG. 4, the gradient of the curve $C_Z$ of i is steep and sustained, thus making an excellent behaviour of the boundary layer; moreover, the $C_{Z\,max}$ reaches the value of 1.94 and the stalls are sharp but of limited amplitude. This latter feature may, moreover, be modified, according, for example to the shape in plan of the wing, its twist or the position adopted for the stabilizer.

For a $C_{Zmax}$ of 1.94, the $C_{Z\,mini}$ is $-1.60$, this giving a total amplitude for the domain of lift of: $1.94 - (-1.60)$, or 3.54. For comparison, a conventional airfoil of type 23012 gives, under the same test conditions, an amplitude equal to 2.46.

Moreover, FIG. 4 shows the symmetry of the stalls at the positive and negative angles of attack, as well as the quasi-absence of hysteresis between the tests of increasing and decreasing angles of attack, this translating an aptitude for resustaining without delay of the air flow around the airfoil. This feature is important for all uses of the airfoil, as it allows in particular a very good control of the apparatus in flight.

FIG. 5 shows the variations of the coefficient of lift $C_Z$ as a function of the coefficient of the pitching moment $C_m$ for a speed of 55 m/s. It shows that the linearity of the coefficient of pitching moment between the two stalls allows a centering with minimum static margin. The moment coefficient $C_m$ with zero lift is, furthermore, very low, and the results obtained for the test speed of 55 m/s confirm the symmetry and stability of the stalls, as well as the quasi-absence of hysteresis in the returns to the normal flight domain.

The invention therefore make it possible, for a range of speeds which covers up to stall the actual domain of flight of the light aircraft, to define a wing airfoil having a wide range of functioning and a variation which may be small between the maximum and minimum coefficients of lift.

Consequently, the invention finds numerous applications for light aircraft of the aerobatic type, but also for travel and training.

Although the invention has been described hereinabove more precisely with regard to a fixed wing, it is obvious that it may be applied to the production of a rotary wing, particularly for a helicopter or the like.

We claim:

1. An aerodynamic wing airfoil comprising non-concave upper surface and lower surface, which are disposed dissymmetrically on either side of a datum axis superposed to the chord of the airfoil, which are forwardly limited along said chord by a leading edge and rearwardly by a trailing edge, and of which the respective thicknesses are counted from said chord, wherein the lower surface and upper surface respectively comprise on the one hand a first convex region of variable curvature disposed between the leading edge and their points corresponding to the maximum lower surface and upper surface thicknesses and intended to produce, partially or totally, the acceleration and depression of the fluid, and on the other hand a second region disposed between said points corresponding to the maximum lower surface and upper surface thicknesses and the trailing edge and subdivised into a first convex zone with moderately variable curvature, disposed immediately behind said points corresponding to the maximum lower surface and upper surface thicknesses and ensuring the deceleration and rapid recompression of the fluid, and into a second zone following the first and continuing to the trailing edge, this second zone presenting a zero or substantially zero curvature and extending over at least 50% and at the most 96% of the length of the chord, said second zone continuing more weakly the deceleration and ensuring the recompression of the fluid with a pressure gradient which diminishes in the direction of flow, said maximum thicknesses being disposed from the leading edge at a distance at the most equal to 22% of the length of said chord, and the ratio between the maximum thickness of the lower surface and the maximum thickness of the upper surface being at least equal to 0.25 and at the most equal to 1.

2. An aerodynamic airfoil as claimed in claim 1, wherein the orthogonal projection on the chord of the point of maximum thickness of the lower surface is nearer the leading edge than the corresponding orthogonal projection of the point of maximum thickness of the upper surface.

3. An aerodynamic airfoil as claimed in claim 1, wherein the maximum thickness of the upper surface is placed from the leading edge, at a distance at least equal to 12% and at the most equal to 20% of the length of the chord.

4. An aerodynamic airfoil as claimed in claim 1, wherein the maximum thickness of the lower surface is placed from the leading edge, at a distance at least equal to 3.75% and at the most equal to 18% of the length of the chord.

5. An aerodynamic airfoil as claimed in claim 1, wherein the shape of the first region of variable curvature, disposed between the leading edge and the maximum thickness of the upper surface and the lower surface, is determined for a chord of length l, and in a system of orthogonal axes of which the origin merges with the respective base of said maximum thickness on the chord and of which the axis of the abscissae merges with the chord of said airfoil, on the one hand for the upper surface by the equation:

$$\left[\frac{|X|}{X_1}\right]^m + \left[\frac{Y}{Y_1}\right]^m = 1$$

on the other hand for the lower surface by the equation:

$$\left[\frac{X}{X_2}\right]^n + \left[\frac{Y}{Y_2}\right]^n = 1$$

$|X|$ representing the absolute value of the abscissae, with $1.8 \leq m \leq 2.1$ $1.8 < n < 2$ $X_1$ and $X_2$ being the respective distances from the leading edge to the origins of said systems of orthogonal axes and being subjected to the conditions:

$0.12 \times l \leq X_1 \leq 0.2 \times l$ $0.0375 \times l \leq X_2 \leq 0.18 \times l$ whilst the respective maximum thicknesses $Y_1$ and $|Y_2|$ of the upper surface and of the lower surface, of which the sum is represented by the value $Y_0$ are defined by the equations:

$0.25 \leq |Y_2|/Y_1 \leq 1$ $0.08 \times l \leq Y_0 \leq 0.22 \times l$ $|Y_2|$ being the absolute value of the minimum ordinate of the lower surface.

6. An aerodynamic airfoil as claimed in claim 1, wherein the shape of the first zone of moderately variable curvature disposed immediately behind the maximum thickness of the upper surface or of the lower surface is determined for a chord of length l, and in a system of orthogonal axes of which the origin merges with the respective base of said maximum thickness on the chord and of which the axis of the abscissea merges with the chord of the airfoil, on the one hand for the upper surface by the equation:

$$\left[\frac{X}{3X_1}\right]^p + \left[\frac{Y}{Y_1}\right]^p = 1$$

on the other hand for the lower surface by the equation:

$$\left[\frac{X}{1,5X_2}\right]^n + \left[\frac{Y}{Y_2}\right]^n = 1$$

$1.4 < p < 1.5$
$1.8 < n < 2$ $X_1$ and $X_2$ being the respective distances from the leading edge to the origins of said systems of orthogonal axes and being subject to the conditions $$0.12 \times l \leq X_1 \leq 0.2 \times l$$

$$0.0375 \times l \leq X_2 \leq 0.28 \times l$$

whilst the respective thicknesses $Y_1$ and $Y_2$ of the upper surface and of the lower surface, of which the sum is represented by value $Y_0$, are definied by the equations:

$$0.25 < |Y_2|/Y_1 \leq 1$$

$$0.08 \times l \leq Y_0 \leq 0.22 \times l$$

$|Y_2|$ being the absolute value of the minimum ordinate of the lower surface.

7. An aerodynamic airfoil as claimed in claim 1, wherein the zone of moderately variable curvature of the upper surface follows the first region of variable curvature which precedes it over a length of chord at least equal to 40% and at the most equal to 150% of the length of chord delimiting said first region of variable curvature.

8. An aerodynamic airfoil as claimed in claim 1, wherein the zone of moderately variable curvature of the lower surface follows the first region of variable curvature which precedes it over a length of chord at least equal to 6% an at the most equal to 140% of the length of chord delimiting said first region of variable curvature.

9. An aerodynamic airfoil as claimed in claim 1, wherein the trailing edge of the profile comprises a base of which the thickness represents at least 0.2% and at the most 1% of the length of chord.

10. An aircraft provided with a fixed wing having an aerodynamic airfoil in accordance with claim 1.

11. An aircraft provided with a rotary wing having an aerodynamic airfoil in accordance with claim 1.

* * * * *

UNITED STATES PATENT AND TRADEMARK OFFICE
CERTIFICATE OF CORRECTION

PATENT NO. : 4,240,598
DATED : December 23, 1980
INVENTOR(S) : VINAS ESPIN ET AL.

It is certified that error appears in the above-identified patent and that said Letters Patent are hereby corrected as shown below:

Col. 5, line 30 "or" should be --of--.

First Page, inventor's name should read

--Yves F. P. Morchoisne-- and not "Yves F. P. Marchoisne".

Signed and Sealed this

Sixteenth Day of June 1981

[SEAL]

Attest:

RENE D. TEGTMEYER

Attesting Officer

Acting Commissioner of Patents and Trademarks